Dec. 19, 1950     F. J. MILLER ET AL     2,534,615
RADIATOR TESTING DEVICE

Filed Sept. 16, 1947     2 Sheets-Sheet 1

INVENTOR.
Fred J. Miller and
Merle J. Graham,
BY
THEIR ATTORNEY.

Dec. 19, 1950 F. J. MILLER ET AL 2,534,615
RADIATOR TESTING DEVICE
Filed Sept. 16, 1947 2 Sheets-Sheet 2

INVENTOR.
Fred J. Miller and
Merle J. Graham,
BY Ernest J. Mechlin
THEIR ATTORNEY.

Patented Dec. 19, 1950

2,534,615

UNITED STATES PATENT OFFICE 2,534,615

RADIATOR TESTING DEVICE

Fred J. Miller and Merle J. Graham,
Dickinson, N. Dak.

Application September 16, 1947, Serial No. 774,242

5 Claims. (Cl. 73—51)

This invention relates generally to radiator testing devices and more particularly to devices for testing and detecting leaks in radiators of tractors and other motor vehicles.

An object of the invention is to provide an improved device for testing radiator cores of tractors and the like which is of simple and rugged construction and readily applicable to radiator cores employing header plates in which the ends of the conduits are mounted.

Another object of the invention is to provide an improved device for testing the radiator cores of tractors and the like, having novel and inexpensive means for obtaining a fluid-tight enclosure of the ends of the conduits of the core to enable fluid pressure to be applied thereto.

An additional object of the invention is to provide an improved device for testing the radiator cores of tractors and the like which can be applied to radiators of different size.

Other objects and advantages of the invention will appear hereinafter in the detailed description, be particularly pointed out in the appended claims and illustrated in the accompanying drawings in which:

Figure 1:
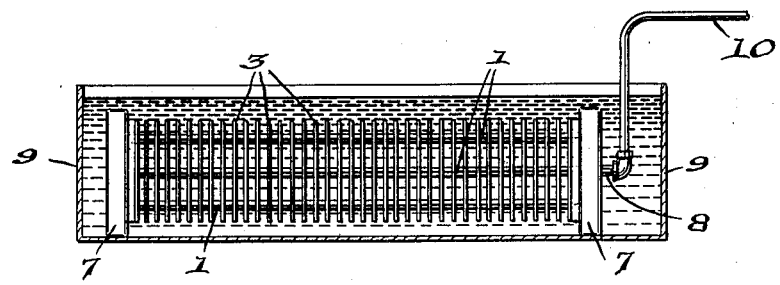
Figure 1 is a side elevational view showing a testing device embodying the present invention applied to a radiator core immersed in water, the side of the tank being removed to more clearly indicate the details of construction.
Figure 2:
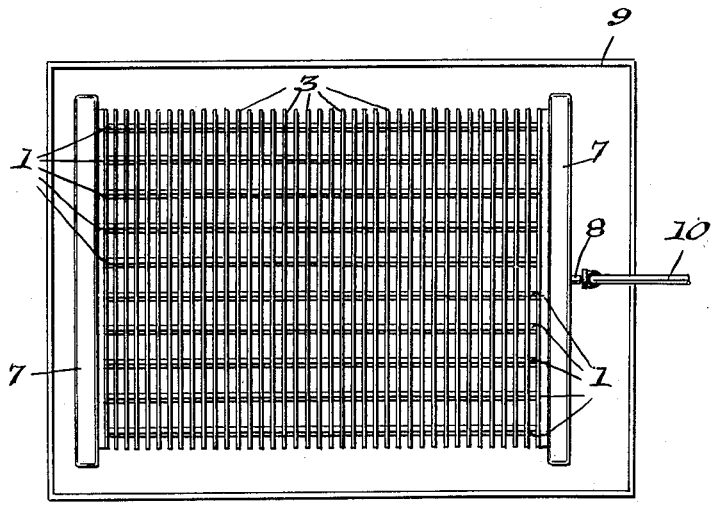
Figure 2 is a plan view of the device as shown in Figure 1.
Figure 3:
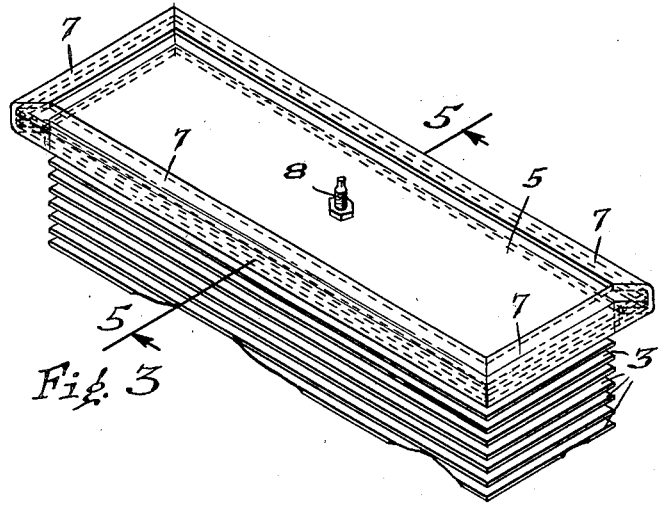
Figure 3 is an isometric view on an enlarged scale of an end portion of a radiator core showing the corresponding part of the testing device in operative position.
Figure 5:
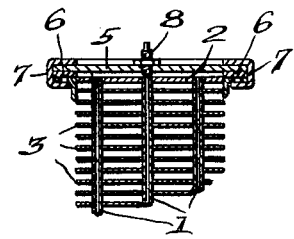
Figure 5 is a vertical sectional view taken along the lines 5—5 of Figure 3.
Figure 4:
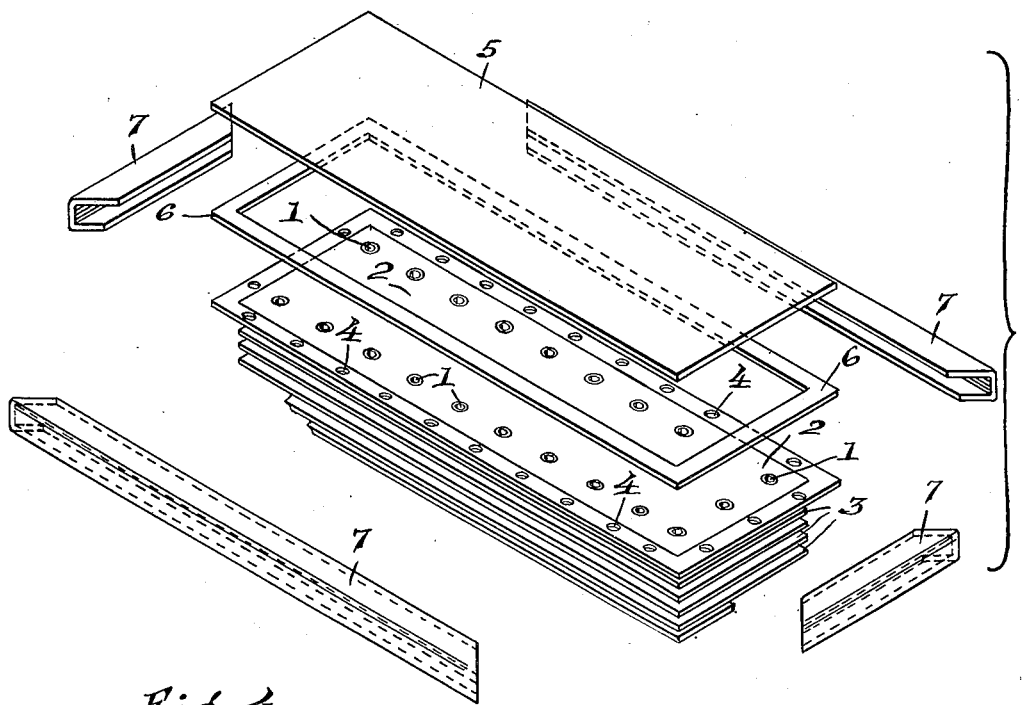
Figure 4 is an exploded view of the part of the device shown in Figure 3.

Referring now in detail to the drawings, illustrating a preferred embodiment of the invention, and in which like reference characters designate like parts, the radiator testing device of the present invention has been applied to a radiator core of the type commonly employed in tractor radiators. As shown, the core comprises a plurality of tubes or conduits 1, the opposite ends of which are mounted or fixed in and extend through a pair of spaced header plates 2, intermediate which are disposed a plurality of baffle plates 3, the core being adapted to be bolted to its housing on the tractor through the bolt holes 4 in the header plates.

It is the normal practice to test radiator cores by immersing them in water and thereafter injecting air or other fluid under pressure through their several tubes. For this purpose it is necessary either that the air be applied to each tube individually or that the ends of the tubes be connected through a single fluid-tight housing to enable all of the tubes to be tested at one time. In the device of the present invention the latter method is employed. This is accomplished by the provision of a pair of end, cover or sealing plates 5 of steel or other relatively rigid material, each of which is adapted to be applied to or seated over the header plates 2 at the opposite ends of the core. Interposed between each of the cover plates and its associated header plate and encircling or enclosing the ends of the tubes 1 is a gasket or seal 6 of rubber or other suitable material.

For applying the cover plates 5 to the header plates 2 through the gaskets 6 with sufficient force to obtain a fluid-tight joint or connection and thus provide a sealed enclosure at either end of the core common to all of the tubes 1, there are provided a plurality of U-clamps or clips 7. These clamps are resilient, preferably being made of spring steel, and, as shown, are adapted to be slid over and clamp or tightly embrace by spring pressure the opposite faces of each end plate and its associated header plate. The clamps at either end of the core may be two or more in number, one on each side or a total of four having been found the most practical arrangement for the illustrated rectangular header and end plates. To ensure a fluid-tight connection each of the clamps desirably extends substantially the length of its side of the header plate and its ends may be beveled to interfit with the contiguous or confronting ends of the adjacent clamps.

After the end plates 5 have been clamped in place air or other fluid may be injected under pressure from one end of the device through a suitable fitting 8 in one of the end plates. To test a radiator core to which the end plates have been clamped it is then only necessary to immerse the core in water in a tank or other suitable container 9 and apply fluid under pressure through a pipe or other suitable conduit 10 attached to the fitting 8. Since the tubes open into common end enclosures any leaks in the radiator can immediately be detected and later repaired.

As previously explained, the U-clamps 7 are the means utilized for applying the force to the cover plate 5 and header plate 2 required to obtain the desired fluid-tight connection. Thus, it is only necessary to employ cover plates of sufficient size and clamps having legs of sufficient length to enable one set of cover plates and clamps to be applied to radiator cores of different size, using the same or, if necessary, different size gaskets.

From the above detailed description it will be apparent that there has been provided an improved radiator core testing device which consists of a minimum of parts of rugged construction and can readily be employed with cores of different size. It should be understood that the described and disclosed embodiment is merely exemplary of the invention and that all modifications are intended to be included that do not depart either from the spirit of the invention or the scope of the appended claims.

Having now described our invention, we claim:

1. A radiator testing device comprising sealing plates adapted to be applied over the outer faces of the header plates of a radiator core, a gasket adapted to be interposed between each sealing plate and its associated header plate and encircle the ends of the tubes of said core, and a plurality of U-clamps for connecting said sealing plates and header plates.

2. A radiator testing device comprising sealing means adapted to overlie the header plates of a radiator core and provide enclosures common to the tubes thereof, and resilient clips adapted to embrace opposite faces of said sealing means and header plates and provide fluid-tight connections therebetween.

3. In a radiator testing device in which a sealing member is adapted to be applied over the header plate of a radiator core and provide an enclosure therebetween, a plurality of resilient U-clamps for embracing and connecting said sealing member and header plate in fluid-tight relation.

4. In a radiator testing device for use with a radiator core of the type having one or more header plates in which the ends of the radiator tubes are mounted, the combination of a cover plate adapted to be applied over said header plate in spaced relation thereto, sealing means interposed between said cover plate and header plate outwardly of said tube ends, resilient clips for tightly embracing the opposite faces of said cover and header plates and clamping said plates in fluid-tight relation, and means for admitting fluid under pressure into the space between said plates.

5. In a radiator testing device, the combination of a sealing member adapted to be applied over a header plate of a radiator core and provide an enclosure therebetween, and a U-clamp tightly embracing opposite faces of said member and plate and connecting said member and plate in fluid-tight relation.

FRED J. MILLER.
MERLE J. GRAHAM.

REFERENCES CITED

The following references are of record in the file of this patent:

UNITED STATES PATENTS

| Number | Name | Date |
|---|---|---|
| 1,291,375 | Berg | Jan. 14, 1919 |
| 1,613,217 | Armstrong | Jan. 4, 1927 |
| 2,231,518 | Boerger | Feb. 11, 1941 |
| 2,268,529 | Stiles | Dec. 30, 1941 |